(12) United States Patent
Lisi et al.

(10) Patent No.: US 8,908,400 B2
(45) Date of Patent: Dec. 9, 2014

(54) VOLTAGE MULTIPLICATION IN A WIRELESS RECEIVER

(75) Inventors: Gianpaolo Lisi, Campbell, CA (US); Ali Djabbari, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 648 days.

(21) Appl. No.: 13/036,998

(22) Filed: Feb. 28, 2011

(65) Prior Publication Data
US 2012/0170337 A1    Jul. 5, 2012

Related U.S. Application Data

(60) Provisional application No. 61/428,139, filed on Dec. 29, 2010.

(51) Int. Cl.
*H02M 7/219* (2006.01)
*H02J 5/00* (2006.01)

(52) U.S. Cl.
CPC ...................................... *H02J 5/005* (2013.01)
USPC ................................ 363/61; 363/89; 363/127

(58) Field of Classification Search
USPC ............. 363/17, 21.04, 21.12, 49, 61, 84, 89, 363/126, 127
See application file for complete search history.

(56) References Cited

U.S. PATENT DOCUMENTS

| | | | | |
|---|---|---|---|---|
| 5,946,202 A | * | 8/1999 | Balogh | 363/26 |
| 6,160,724 A | * | 12/2000 | Hemena et al. | 363/61 |
| 7,606,532 B2 | * | 10/2009 | Wuidart | 455/41.1 |
| 7,741,734 B2 | | 6/2010 | Joannopoulos et al. | |
| 7,848,127 B2 | * | 12/2010 | Horino | 363/84 |
| 8,222,872 B1 | * | 7/2012 | Melanson et al. | 323/222 |
| 2007/0086219 A1 | * | 4/2007 | Yasumura | 363/21.02 |
| 2009/0067207 A1 | * | 3/2009 | Nishino | 363/126 |
| 2009/0190379 A1 | * | 7/2009 | Melanson et al. | 363/21.13 |
| 2011/0134673 A1 | * | 6/2011 | Ho et al. | 363/127 |
| 2011/0199799 A1 | * | 8/2011 | Hui et al. | 363/127 |

OTHER PUBLICATIONS

Amos, S.W. Amos R.S. (1999). Newnes Dictionary of Electronics. p. 273. Elsevier. Online version available at: http://app.knovel.com/hotlink/toc/id:kpNDE00005/newnes-dictionary-electronics.*
Chwei-Sen Wang, et al.; "Power Transfer Capability and Bifurcation Phenomena of Loosely Coupled Inductive Power Transfer Systems," IEEE Xplore (2004).
Yuequan Hu, et al.; "Universal-Input Single-Stage PFC Flyback with Variable Boost Inductance for High-Brightness LED Applications," IEEE (2010).

(Continued)

*Primary Examiner* — Fred E Finch, III
(74) *Attorney, Agent, or Firm* — Andrew Viger; Frederick J. Telecky, Jr.

(57) ABSTRACT

A wireless energy transfer receiver includes an input configured to receive alternating current (AC) electric energy and an output configured to make available direct current (DC) electric energy. The receiver further includes a rectification component configured to convert the AC energy received at the input into DC energy available at the output, the DC energy made available as DC voltage; and a multiplication component configured to amplify a peak voltage of the AC energy received at the input, the DC voltage made available at the output correspondingly being higher than the peak voltage of the AC energy received at the input.

6 Claims, 7 Drawing Sheets

(56) References Cited

OTHER PUBLICATIONS

G. Vandevoorde, et al.; "Wireless energy transfer for stand-alone systems: a comparison between low and high power applicability," Published by Elsevier Science B.V. (2001).

Xiao Zhi Jian, et al.; "A Novel Wirless Charging System for Movable Telephone with Printed-circuit-board Wlndings of Different Structure and Shape Respectively," International Conference on Electrical Machines and Systems 2007, Oct. 8-11, Seoul, Korea.

R. Laouamer, et al.; "A Multi-Resonant Converter for Non-Contact Charging with Electromagnetic Coupling," IEEE Xplore (Jul. 22, 2010).

Hideaki Abe, et al.; "A Noncontact Charger Using a Resonant Converter with Parallel Capacitor of the Secondary Coil," IEEE Xplore (Jul. 22, 2010).

Jun Pan, et al.; "A Self-Powered Sensor Module Using Vibration-Based Energy Generation for Ubiquitous Systems," IEEE (2005).

Geffrey K. Ottman, et al.; "Adaptive Piezoelectric Energy Harvesting Circuit for Wireless Remote Power Supply," IEEE (2002).

C.-C., Tsai, B., et al.; "Design Wireless Transcutaneous Energy Transmission System for Totally Artificial Hearts," IEEE (2000).

David L. Mascarenas, et al.; "Experimental studies of using wireless energy transmission for powering embedded sensor nodes," Journal of Sound and Vibration, Published by Elsevier Ltd. (2009).

Jonsensor Zhao,; "A new calculation for designing multilayer planar spiral inductors," EDN (Jul. 29, 2010).

Andre Kurs, et al., "Wireless Power Transfer via Strongly Coupled Magnetic Resonances," Science Express, Jun. 2007.

Takehiro Imura, et al, "Basic Experimental Study on Helical Antennas of Wireless Power Transfer for Electric Vehicles by using Magnetic Resonant Couplings," IEEE (2009).

Aristeidis Karalis, et al., "Efficient wireless non-radiative mid-range energy transfer," Elsevier, Science Dlrect, Annals of Physics, (2007).

* cited by examiner

VOLTAGE MULTIPLICATION IN A WIRELESS RECEIVER

CROSS REFERENCE TO RELATED APPLICATIONS

The present application claims benefit to U.S. provisional application 61/428,139 filed Dec. 29, 2010 entitled Voltage Multiplication for Increasing the Charging Power Received at a Wireless Receiver, the contents of which is incorporated herein in its entirety.

BACKGROUND

Energy transfer between two coupled inductors may occur through the use of a transmitter generating an oscillating magnetic field and a receiver converting the oscillating magnetic field into electric power. In many energy transfer systems the conversion is from oscillating magnetic field into a direct current (DC) voltage.

The DC voltage is at least in part a function of magnetic field intensity and the coupling between the inductors. If the magnetic field intensity decreases or the coupling between the inductors decreases, then DC voltage may also decrease. If the DC voltage drops below the minimum voltage required by the load then energy transfer ceases.

DETAILED DESCRIPTION

A wireless energy transfer system may include coupled inductors or coils, a transmitter capable of generating a high-intensity oscillating magnetic field, and a receiver capable of converting the magnetic field into usable electric power. The electric power is provided to a load.

The conversion of the magnetic field into usable electric power may include a rectification process if the load requires a continuous voltage source.

In many systems the load requires a minimum voltage for proper operation. However, as the magnetic field intensity and/or the coupling between the inductors decreases, the voltage to the load may also decrease to a value below the minimum operational voltage of the load. It would be beneficial in some circumstances to have the capability on the receiver side to increase the voltage to the load so that the voltage to the load exceeds the minimum operational voltage requirements of the load.

Additionally, the capability on the receiver side to increase the voltage to the load would beneficially allow for the transmitter to at least one of (i) generate a lower intensity magnetic field, (ii) allow for lesser coupling between the coils, and (iii) design the receiver coil with fewer turns, therefore saving cost and reducing losses.

Figure 1:
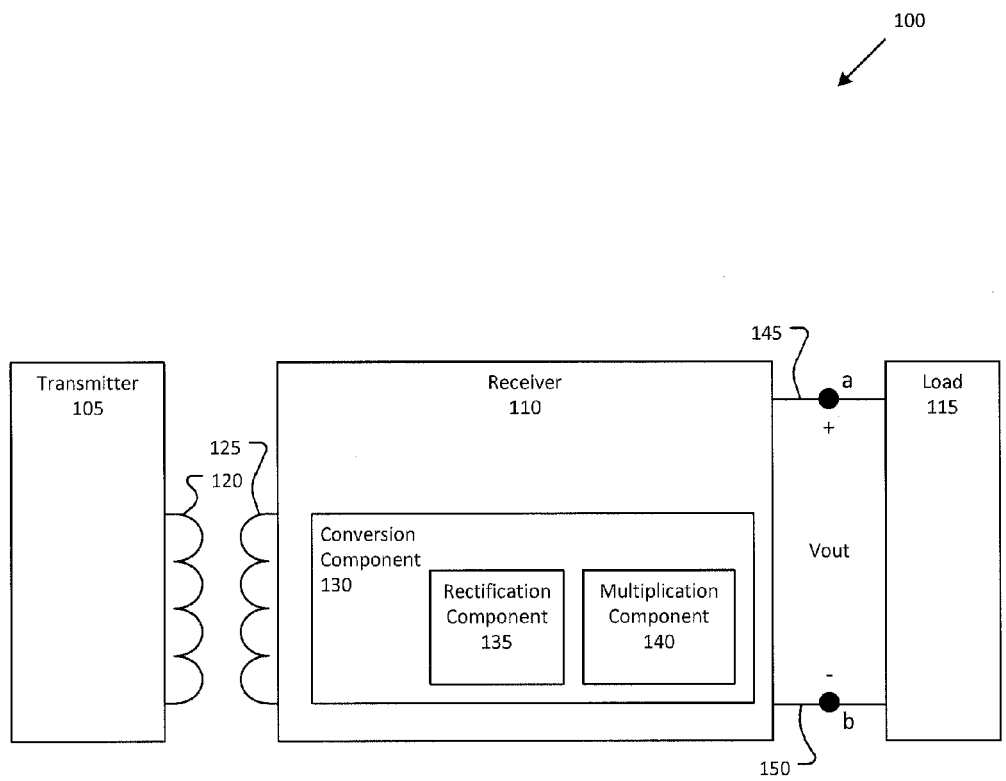
FIG. 1 illustrates an exemplary wireless energy transfer system.

FIG. 1 illustrates an exemplary wireless energy transfer system 100 including a transmitter 105, a receiver 110, a load 115, and coils 120 and 125. Transmitter 105 provides a magnetic field at coil 120, which is magnetically coupled to coil 125. Receiver 110 converts the magnetic field coupled on coil 125 to electric power provided to load 115.

Receiver 110 includes a conversion component 130, which further includes a rectification component 135 and a multiplication component 140. Components 130, 135, and 140 each represent at least one of or a combination of circuitry, firmware, and software that perform the underlying function of the respective component. Circuit elements of rectification component 135 and a multiplication component 140 may be implemented within one circuit including within one integrated circuit or may be implemented within separate circuits. Receiver 110 may include digital or analog circuits or a combination of digital and analog circuits. Components 130, 135, and 140 are described further below.

Receiver 110 is connected to load 115 at least via connections 145 and 150. Power provided to load 115 is represented in FIG. 1 as a potential voltage difference Vout between a node 'a' on connection 145 and a node 'b' on connection 150.

Figure 2:
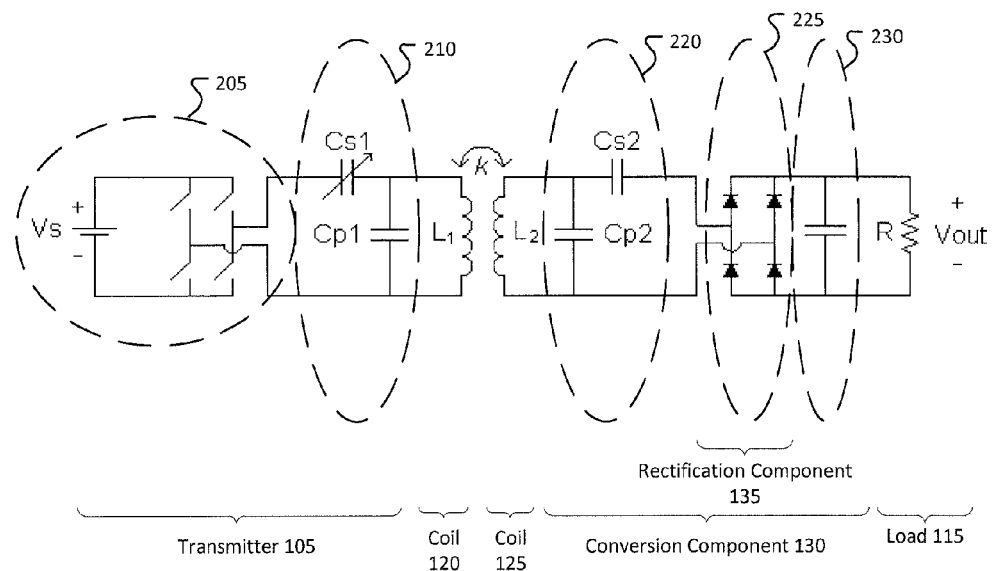
FIG. 2 illustrates a representative exemplary implementation of a wireless energy transfer system.

FIG. 2 illustrates a representative exemplary implementation of a system 100 in the form of a circuit diagram, system 100 including a transmitter 105, a coil 120, a coil 125, a conversion component 130 with rectification component 135, and a load 115, as identified below the circuit diagram.

Components of transmitter 105 include a voltage source 205 and a transmitter resonant network 210. Coil 120 has self-inductance L1. A high-intensity oscillating magnetic field is established within transmitter resonant network 210 and coil 120 by applying voltage source 205 to transmitter resonant network 210.

The magnetic field is coupled to coil 125 having self-inductance L2. The coupling coefficient between coils 120 and 125 is represented as 'k' on the circuit diagram.

Coil 125 is connected to a receiver resonator network 220. As the magnetic field is coupled onto coil 125 it is converted into a high voltage oscillating signal within receiver resonator network 220 and coil 125.

A rectifier 225 converts the oscillating signal into a direct current (DC) voltage. A capacitor 230 is used to reduce ripple in the DC voltage, and the DC voltage, Vout in FIG. 2, may be applied to a load.

The circuitry illustrated in FIG. 2 is representative. Many other topologies are possible for implementing voltage source 205, resonator networks 210 and 220, rectifier 225, and capacitor 230. Further, one or both of coils 120 and 125 may represent multiple coils. Coils 120 and 125 may be different sizes and shapes. Load 115, although represented by resistance R, may be a complex load.

Figure 3:
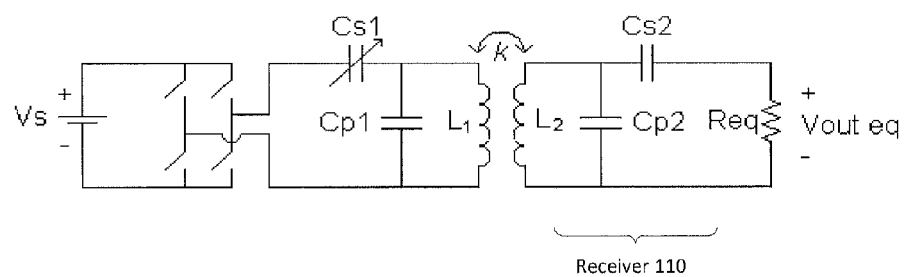
FIG. 3 illustrates another representative exemplary implementation of a wireless energy transfer system.

FIG. 3 is a simplified equivalent of the circuit of FIG. 2. The simplification is based on an assumption that the higher order harmonics of the square-wave voltage at the input of the rectifier are suppressed by the narrow-band filter formed by receiver resonant network 220 and coil 125. Only the fundamental sinusoidal component is taken into account in determining an equivalent circuit. The assumption as stated allows rectifier 225, capacitor 230, and load 115 to be approximated by a resistor $R\_eq = R \cdot 8/\pi^2$.

Vout applied to the load is then described by equation (1), where $\omega$ is the operating frequency of the circuit expressed in radians per second (rad/s).

$$V\text{out}\_eq(t) = V\text{out} \cdot 4/\pi \cdot \sin(\omega t) \quad (1)$$

It can be shown that Vout is a strong function of the transmitter voltage source, such as voltage source 205 in FIG. 2. Vout can also be shown to be a strong function of the coupling between coils 120 and 125, for example as represented by coefficient k in FIG. 2. Thus, the amplitude of Vout varies with the amplitude of the magnetic field and the strength of the coil coupling.

The magnetic field may be affected by the number and type of objects near the transmitter, the tuning of the resonant circuit, and the stability and efficiency of the voltage source, to name a few influencing factors. The coupling between the coils may be affected by distance between the coils, orientation of the coils with respect to each other, geometry of the coils, size difference between the coils, and the medium in the space between the coils (e.g., air, metal housing, and magnetic materials), to name a few influencing factors.

As the magnetic field intensity decreases and/or the coupling between the coils weakens the magnitude of Vout decreases. When Vout drops below the minimum operational voltage required by the load, energy transfer ceases.

Much research has been performed with the goal of increasing magnetic field intensity at the transmitter or increasing coupling between the coils of the transmitter and receiver. However, many influences affect magnetic field intensity and coupling in an actual user environment. Thus, even for a system in which the transmitter is designed to ideally generate a high intensity magnetic field and the system is designed to ideally achieve a strong coupling between the coils, the actual energy transfer predicted by the ideal design may not occur.

As can be seen, there are many ways in which even a well-designed system may not effectively transfer energy to the receiver.

It would therefore be desirable to provide for a multiplication of the voltage at the receiver. Not only would voltage multiplication at the receiver allow the system to perform effectively in an actual environment but also may allow the design requirements of the system to be relaxed, and may further allow the performance of the system to be improved with little or no change to the transmitter.

A receiver including voltage multiplication may allow, for example, a lower transmitter source voltage, a greater distance between transmitter and receiver, and misalignment of the transmitting and receiving devices. Additionally or alternatively, because multiplication of the voltage at the receiver allows for weaker coupling between the coils, the coils may be smaller and/or may be designed using less costly material.

Having identified the need for and benefit of voltage multiplication at the receiver, a suitable multiplier is selected. Referring again to FIG. 1, conversion component 130 may include rectification component 135 and multiplication component 140. As mentioned above, rectification component 135 and multiplication component 140 may be implemented within one circuit and may share circuit elements, or may be implemented separately. Combination voltage multiplier and rectifier circuits may allow for a reduced overall circuit element count, which in turn may allow for reduced size and/or cost. Representative examples of combination voltage multiplier and rectification circuits are illustrated in FIGS. 4-7.

Figure 4:
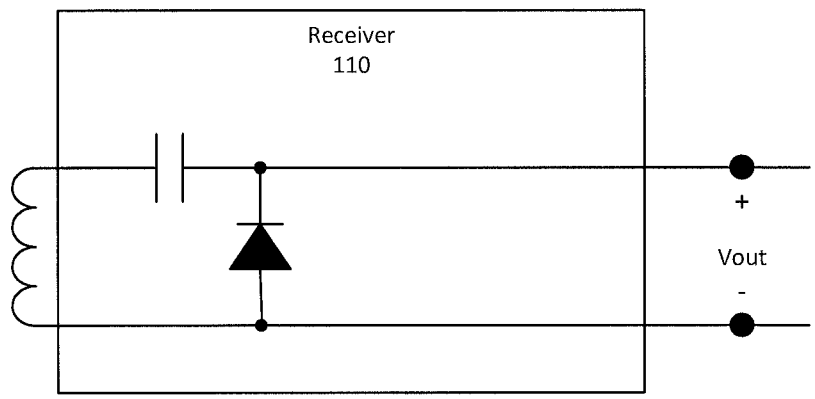
FIG. 4 illustrates an exemplary circuit for voltage doubling.

FIG. 4 illustrates an exemplary Villard circuit. A Villard circuit is a voltage doubler circuit with rectification. The capacitor in the circuit of FIG. 4 may also be used as resonant capacitor for the receiver coil, effectively limiting the rectifier to a simple diode. In the Villard circuit, the capacitor charges during negative phases of the coil voltage to the peak voltage of the negative phase. Effectively, the capacitor voltage provides a direct current (DC) offset for the coil voltage approximately equal to the absolute value of the peak voltage of the negative phase. The output voltage Vout of a Villard circuit oscillates between zero and roughly double the positive peak coil voltage.

Large voltage swings at Vout such as from a Villard circuit may be difficult or impossible for a load to manage. There are a number of voltage multiplier circuits that reduce or minimize voltage ripple by using additional components. Illustrative examples are provided in FIGS. 5-7.

Figure 5:
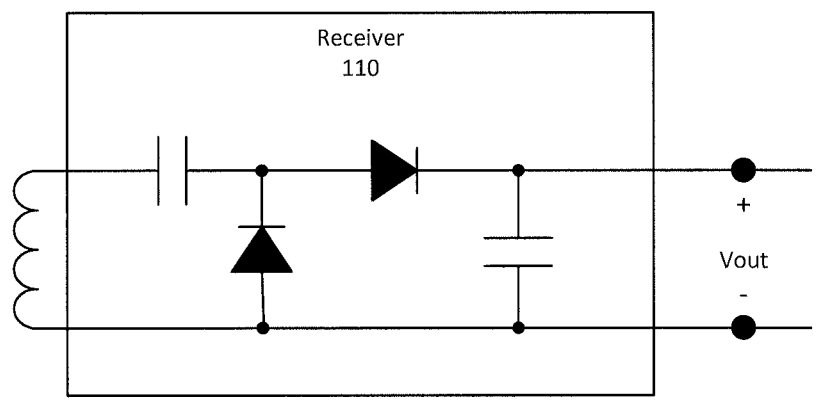
FIG. 5 illustrates another exemplary circuit for voltage doubling.

FIG. 5 illustrates an exemplary Greinacher circuit for voltage doubling, described below.

Figure 6:
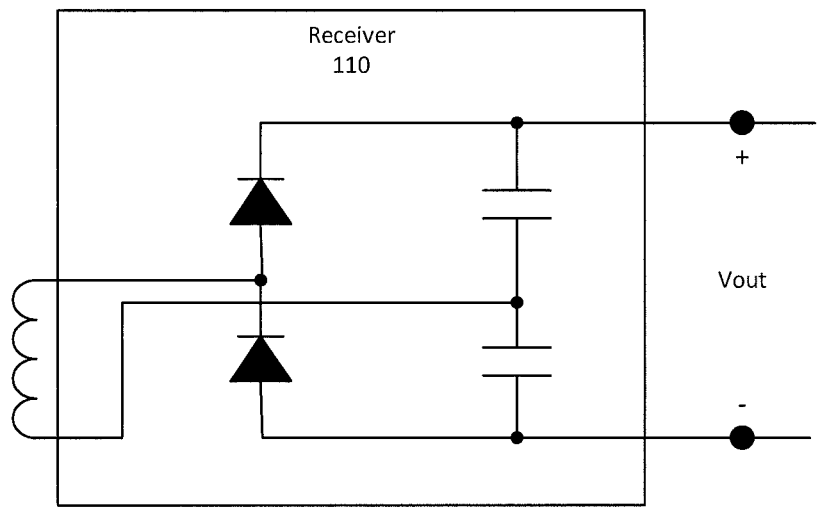
FIG. 6 illustrates another exemplary circuit for voltage doubling.

FIG. 6 illustrates an exemplary Delon voltage doubler circuit. One capacitor is charged during negative cycle phases and one capacitor is charged during positive cycle phases, each capacitor charged to the peak value of its respective phase. Vout is the sum of the voltages on the two capacitors, roughly the positive phase peak voltage plus the absolute value of the negative phase peak voltage.

Figure 7:
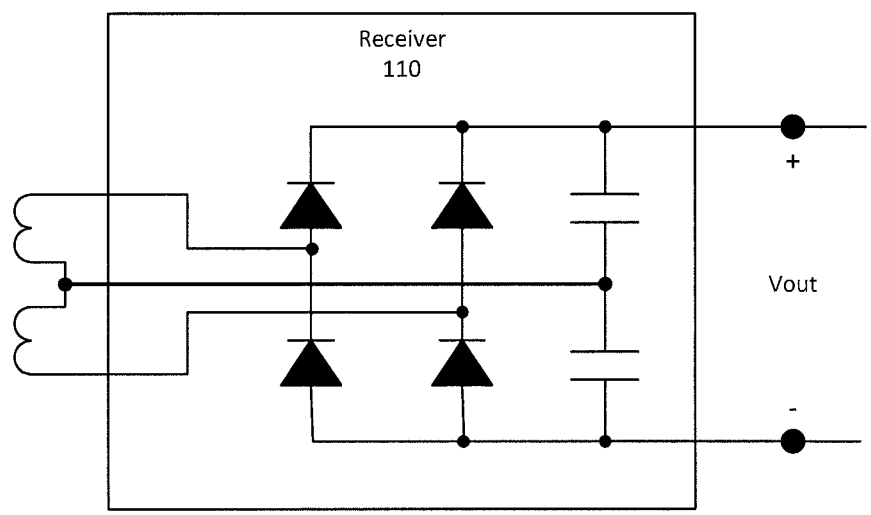
FIG. 7 illustrates another exemplary circuit for voltage doubling.

FIG. 7 illustrates another exemplary voltage doubler circuit, similar to the circuit of FIG. 6 but with a split coil. Both capacitors are charged during both phases, reducing the ripple on the output voltage Vout.

Many other circuit topologies may be implemented to multiply the voltage applied at Vout, not limited to voltage doublers. Further, multipliers may be cascaded. Different circuit topologies may include different filtering mechanisms to shape the voltage at Vout as desired.

Figure 8A:
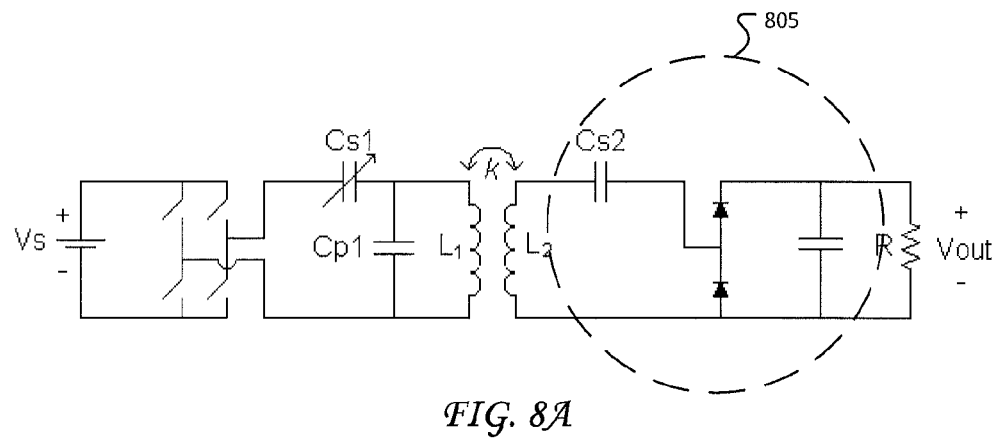
FIG. 8A illustrates one exemplary wireless energy transfer system in which a voltage doubler rectifier is included in the receiver.
Figure 8B:
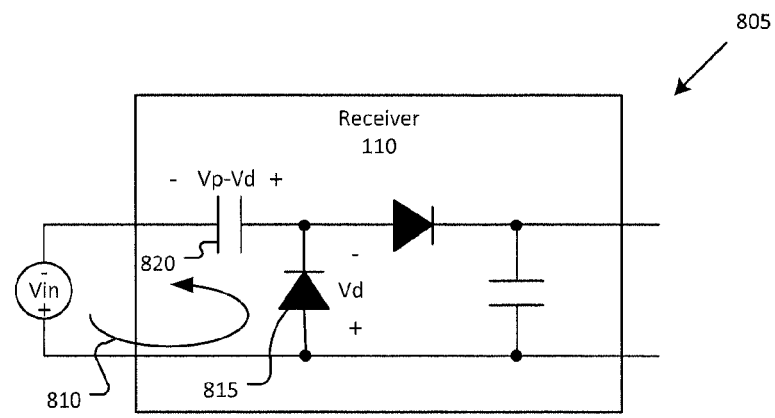
FIG. 8B illustrates the effective circuit of an exemplary receiver including a voltage doubler rectifier when a voltage source is in a negative phase of its cycle.
Figure 8C:
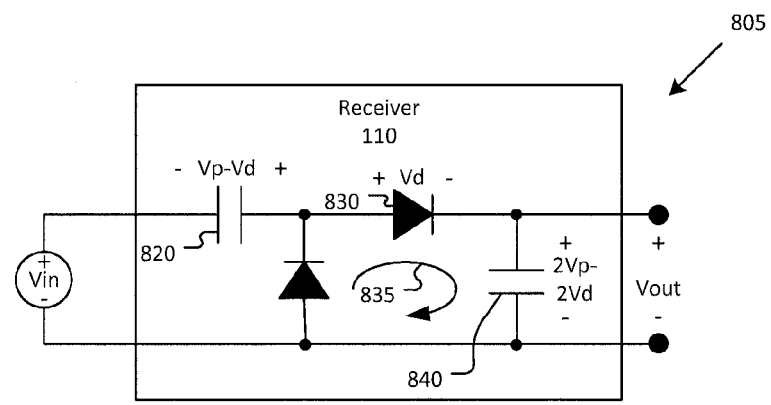
FIG. 8C illustrates the effective circuit of an exemplary receiver including a voltage doubler rectifier when a voltage source is in a positive phase of its cycle.

FIG. 8A illustrates one exemplary wireless energy transfer system in which a Greinacher voltage doubler rectifier 805 as illustrated in FIG. 5 is included in the receiver. FIGS. 8B and 8C provide a simplified explanation of the voltage doubling function of the Greinacher circuit.

FIG. 8B illustrates the voltage across the receiver coil as a voltage source Vin that is in a negative phase of its cycle with peak voltage −Vp. Current flows into receiver 110 as shown by arrow 810. Diode 815 is forward biased and begins to conduct, and develops a forward bias voltage Vd. Capacitor 820 is charged from the current flowing through diode 815 to a voltage of amplitude Vp−Vd, biased as shown in FIG. 8B. Near the end of the negative phase of the cycle diode 815 stops conducting, leaving capacitor 820 charged to Vp−Vd. Reciever coil voltage Vin then transitions to a positive phase of its cycle as illustrated in FIG. 8C.

FIG. 8C illustrates Vin as positive, which establishes a forward bias on diode 830 so that diode 830 begins to conduct and develops a forward bias voltage Vd as shown. Current flows as illustrated by arrow 835. Capacitor 840 begins to charge from the series connection of coil voltage Vin and capacitor 820 which still is charged to approximately Vp−Vd. In the simple case where the peak negative and positive voltages of Vin are equal, capacitor 840 charges to a maximum voltage of (Vp+(Vp−Vd)−Vd)=2Vp−2Vd. In this way capacitor 840 is charged to roughly double the peak input voltage. The capacitor 840 voltage is Vout provided to the load.

Although the Greinacher circuit implementation is illustrated and described in detail, other voltage multipliers or multiplier/rectifiers may be used instead.

The use of voltage multiplier circuits allows receiver 110 to be placed at greater distances before the load voltage drops below usable voltage levels. However, when a voltage-multiplied receiver 110 is then placed closer to a transmitter 105 the receiver 110 circuitry may be subjected to higher voltage stresses. In such a situation it is possible that the voltage on a circuit element may exceed the element's voltage rating, causing the element and thus receiver 110 to operate undesirably. To avoid this circumstance receiver 110 may be designed to withstand high voltages. However, high voltage designs may be cost, size, or otherwise prohibitive.

It would therefore be advantageous to have the capability to enable voltage multiplication at receiver 110 only when needed, or conversely to disable voltage multiplication at receiver 110 when close to a transmitter 105. The receiver 110 circuitry may then be designed for lower voltages.

Figure 9A:
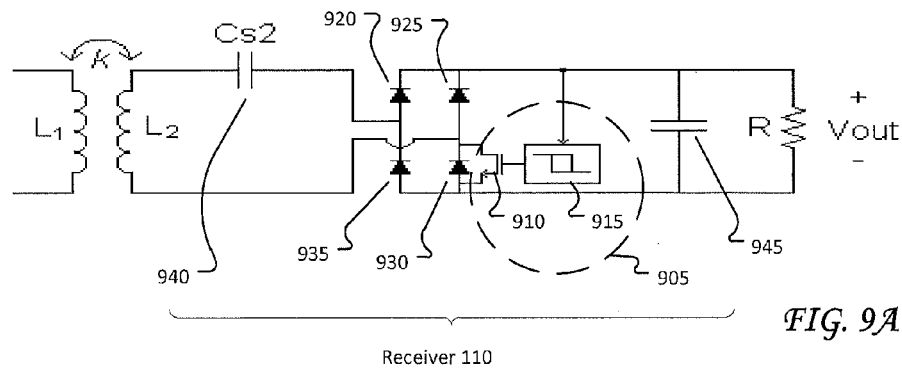
FIG. 9A illustrates an exemplary implementation of a receiver which adaptively enables and disables a voltage multiplication component of a voltage multiplier rectifier circuit.

FIG. 9A illustrates an exemplary implementation of a receiver 110 which adaptively enables and disables a voltage multiplication component 140 of a voltage multiplier rectifier circuit. In the example of FIG. 9 receiver 110 includes a switching circuit 905 with a switch 910 and controller 915. Switch 910 may be any semiconductor or other switching device and is illustrated as a field effect transistor (FET) merely for convenience. A controller 915 monitors the voltage at a point within the receiver, and turns switch 910 on or off according to the monitored voltage, as described below. Controller 915 may include hysteresis such that the voltage must cross a first voltage threshold for controller 915 to turn switch 915 on, and must cross a second threshold for controller 915 to turn switch 915 off.

Monitoring of the voltage may be performed by a separate circuit outside of the receiver 110 circuitry. For example, in a smart phone there may be a voltage monitoring circuit that monitors voltages at various locations within the circuitry of the smart phone, and one such monitoring location may be at receiver 110. In the smart phone example, a processor may evaluate the voltage measurements made by the monitoring circuit and provide signals according to the evaluation. One such signal may be an indication provided to controller 915 to turn switch 910 on or off. Other implementations are also possible. For example, controller 915 may be one circuit on a receiver 110 integrated circuit chip that performs voltage monitoring and controls switch 910.

The receiver of FIG. 9A further includes diodes 920, 925, 930, and 935, and capacitors 940 and 945. These circuit elements are discussed with respect to FIGS. 9B and 9C.

Figure 9B:
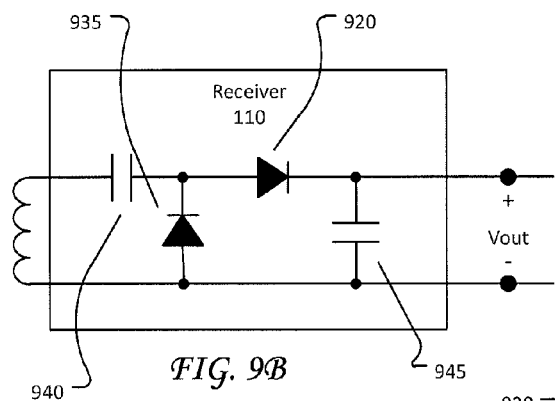
FIG. 9B illustrates an exemplary implementation of an adaptive receiver in a first mode.

FIG. 9B represents the receiver of FIG. 9A when switch 910 is turned on. With switch 910 on, diode 930 is short-circuited. Diode 925 is not used for rectification or multiplication when switch 910 is turned on. The effective rectification multiplication circuit includes only diodes 920 and 935 and capacitors 940 and 945, and is recognizable as a Greinacher circuit that roughly doubles the peak input voltage as discussed above.

Figure 9C:
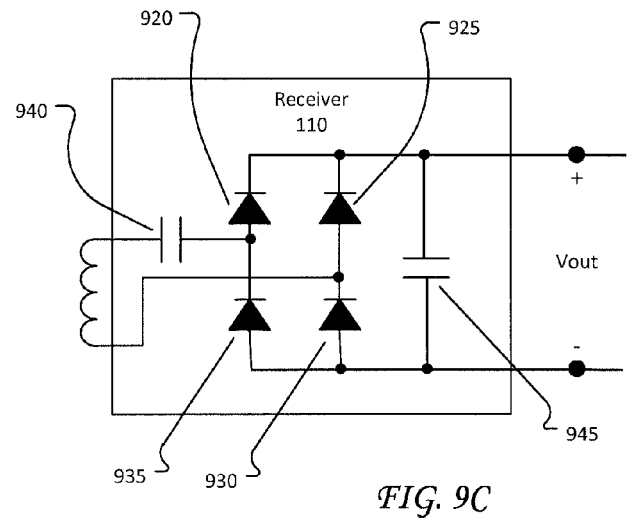
FIG. 9C illustrates an exemplary implementation of an adaptive receiver in a second mode.

FIG. 9C represents the receiver of FIG. 9A when switch 910 is turned off. With switch 910 off, receiver 110 provides rectification with no multiplication. When the voltage across the receiver coil is in a negative phase, diodes 925 and 935 conduct, charging capacitor 945 to some voltage less than the absolute value of the receiver coil negative peak voltage. When the voltage across the receiver coil is in a positive phase, diodes 920 and 930 conduct, charging capacitor 945 to some voltage less than the receiver coil positive peak voltage. The voltage on capacitor 945 depends at least in part on the ratio of the capacitance of capacitors 940 and 945.

In some implementations, an active rectifier topology is used such that, for example, metal oxide semiconductor FETs (MOSFETs) may be used to replace one or more of diodes 920, 925, 935, and 930. In such implementations the adaptive multiplication may be implemented with potentially no additional cost.

Figure 10:
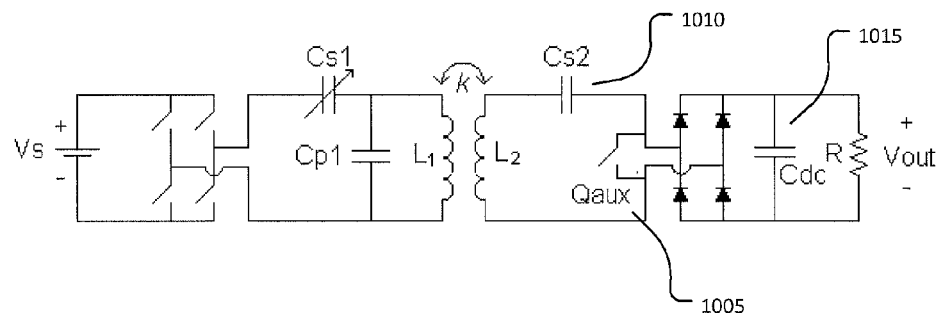
FIG. 10 illustrates another exemplary implementation of a receiver with rectification multiplication circuitry.

FIG. 10 illustrates another exemplary implementation of a receiver 110 with rectification multiplication circuitry. In this example, receiver 110 includes a rectification circuit as described above with respect to FIG. 9C and also includes a switch 1005 (Qaux) that provides the multiplication function.

Without switch 1005, receiver 110 is a rectifier as described above. When switch 1005 is closed, the receiver coil and capacitor 1010 form a resonant tank circuit. The quality factor of this resonant tank is very high and after a few cycles a large amount of energy is stored in the resonant tank. During the time switch 1005 is closed capacitor 1015 delivers power to the load.

When switch 1005 is opened from a closed position the energy stored in the resonant tank gets transferred to capacitor 1015. Thus, the voltage across capacitor 1015, load voltage Vout, increases.

The switching frequency of switch 1005 may be independent of the resonant frequency of the transmitter and receiver circuits and may be chosen to achieve a certain regulation accuracy and output voltage ripple.

To minimize switching losses, switch 1005 may be, for example, switched on at zero voltage and off at zero current.

Figure 11:
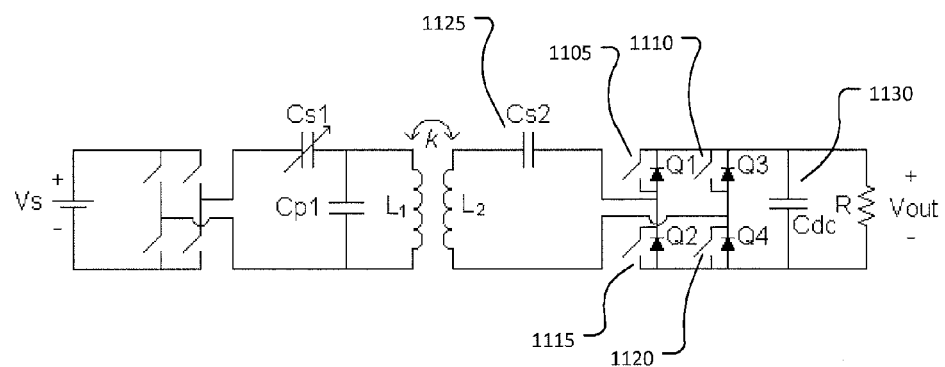
FIG. 11 illustrates an exemplary synchronous rectification circuit that may be used as a rectification multiplication circuit.

FIG. 11 illustrates an exemplary synchronous rectification circuit that may be used as a rectification multiplication circuit similar to the circuit of FIG. 10. Receiver 110 in FIG. 11 includes switches 1105, 1110, 1115, and 1120, one switch for each diode in a full wave rectifier. In this manner, the voltage drop across the diodes in forward bias mode is eliminated.

In the synchronous rectification circuit of FIG. 11, if switches 1115 and 1120 are closed (shorting diodes Q2 and Q4, respectively) then the effective circuit is substantially similar to the circuit of FIG. 10 with switch 1005 closed. The circuit of FIG. 11 may operate in a voltage multiplication mode by closing switches 1115 and 1120 (or switches 1105 and 1110) to charge the resonant tank, then opening switches 1115 and 1120 (or switches 1105 and 1110) to charge capacitor 1130. While capacitor 1130 is charging, synchronous operation of switches 1105, 1110, 1115, and 1120 may occur as described above. Thus, the synchronous rectification circuit of FIG. 11 may also be used to provide for multiplication with little or no additional cost.

An active rectifier topology may be used such for one or more of the circuits described above. For example, metal oxide semiconductor FETs (MOSFETs) may be used to replace one or more diodes.

CONCLUSION

A receiver has been described that improves wireless energy transfer by providing the capability of multiplication of the receiver coil voltage. Such a receiver provides improved performance and may reduce the price of wireless energy transfer systems. The multiplication capability of the receiver may be adaptively turned on and off. A plurality of exemplary implementations has been provided to illustrate a few of the possible topologies that enable multiplication within the receiver.

The above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An apparatus configured as a wireless energy transfer receiver in an electronic device, the wireless energy receiver operable with a wireless energy transmitter for wireless energy transfer from the transmitter to the electronic device, comprising:

an inductive coil configured to receive alternating current (AC) electric energy magnetically coupled into the inductive coil from the wireless energy transmitter;

an output circuit including an output capacitor;

a resonator circuit including the inductive coil and a resonator capacitor;

a synchronous rectification circuit coupled to the inductive coil and the resonator capacitor, and configured to convert the AC energy received at the inductive coil into DC energy supplied to the output circuit including the output capacitor and the electronic device; and the synchronous rectification circuit including four diodes D1-D4 arranged as a diode bridge rectifier, and four transistor switches Q1-Q4 respectively connected across the diodes D1-D4, the transistor switches controlled such that the synchronous rectification circuit is operable in two modes;

a resonant multiplication mode in which transistor switches Q2 and Q4 are conducting, short circuiting respective diodes D2 and D4, and transistors Q1 and Q3 are non-conducting, such that (i) the resonator circuit operates as a resonant tank storing transferred wireless energy on the resonator capacitor, and (ii) DC energy is supplied to the electronic device from the output capacitor; and a rectification mode in which the transistor switches Q1-Q4 are synchronously controlled such that the diode bridge rectifier supplies rectified energy from the resonator circuit to the output circuit.

2. The apparatus of claim 1, wherein
   the inductive coil includes a first terminal and a second terminal;

a first end of the resonator capacitor electrically connected to the first terminal;

the diode D1 anode is electrically connected to a second end of the resonator capacitor, the diode D1 cathode is electrically connected to a first circuit node;

the diode D2 anode is electrically connected to a second circuit node, the diode D2 cathode electrically connected to the diode D1 anode and to the second end of the resonator capacitor;

the diode D3 anode electrically connected to the second terminal, the diode D3 cathode electrically connected to the first circuit node;

the diode D4 anode electrically connected to the second circuit node, the diode D4 cathode electrically connected to the diode D3 anode and to the second terminal; and a first end of the output capacitor electrically connected to the first circuit node, a second end of the output capacitor electrically connected to the second circuit node.

3. The apparatus of claim 2, wherein the transistor switches operable such that:

the transistor switch Q1 when closed implements a short circuit across diode D1;

the transistor switch Q2 when closed implements a short circuit across diode D2;

the transistor switch Q1 when closed implements a short circuit across diode D3; and the transistor switch Q1 when closed implements a short circuit across the diode D4;

wherein in the resonant multiplication mode, transistor switches Q2 and Q4 are closed such that a short circuit is effectively formed between the second terminal and the second end of the resonator capacitor; and wherein in the rectification mode, transistor switches Q1-Q4 are synchronized with transferred energy such that each switch is closed when the corresponding diode is forward biased and each switch is opened when the corresponding diode is reverse biased.

4. A method employable for wireless energy transfer to an electronic device, using a wireless energy transmitter and a wireless energy receiver included in the electronic device, comprising:

configuring the wireless energy receiver with a resonator and a synchronous bridge rectifier, the resonator including an inductive coil magnetically coupled to the wireless energy transmitter, and a resonator capacitor, together forming a resonant tank;

the synchronous bridge rectifier including four diodes D1-D4 arranged as a diode bridge rectifier, and four transistor switches Q1-Q4 respectively connected across the diodes D1-D4;

an output circuit including an output capacitor; and controlling the synchronous bridge rectifier (transistor switches Q1-Q4) to operate in two modes;

a resonant multiplication mode in which transistor switches Q2 and Q4 are conducting, short circuiting respective diodes D2 and D4, and transistors Q1 and Q3 are non-conducting, such that (i) the resonator stores transferred wireless energy on the resonator capacitor, and (ii) DC energy is supplied to the electronic device from the output capacitor; and a rectification mode in which the transistor switches Q1-Q4 are controlled such that the diode bridge rectifier supplies rectified energy from the resonator to the output circuit.

5. The method of claim 4, wherein
   the inductive coil includes a first terminal and a second terminal;

a first end of the resonator capacitor electrically connected to the first terminal;

the diode D1 anode is electrically connected to a second end of the resonator capacitor, the diode D1 cathode is electrically connected to a first circuit node;

the diode D2 anode is electrically connected to a second circuit node, the diode D2 cathode electrically connected to the diode D1 anode and to the second end of the resonator capacitor;

the diode D3 anode electrically connected to the second terminal, the diode D3 cathode electrically connected to the first circuit node;

the diode D4 anode electrically connected to the second circuit node, the diode D4 cathode electrically connected to the diode D3 anode and to the second terminal; and a first end of the output capacitor electrically connected to the first circuit node, a second end of the output capacitor electrically connected to the second circuit node.

6. The method of claim 5, wherein the transistor switches are operable such that:

the transistor switch Q1 when closed implements a short circuit across diode D1;

the transistor switch Q2 when closed implements a short circuit across diode D2;

the transistor switch Q1 when closed implements a short circuit across diode D3; and the transistor switch Q1 when closed implements a short circuit across the diode D4;

wherein in the resonant multiplication mode, transistor switches Q2 and Q4 are closed such that a short circuit is effectively formed between the second terminal and the second end of the resonator capacitor; and wherein in the rectification mode, transistor switches Q1-Q4 are synchronized with transferred energy such that each switch is closed when the corresponding diode is forward biased and each switch is opened when the corresponding diode is reverse biased.

* * * * *